(12) United States Patent
Chen et al.

(10) Patent No.: US 12,181,787 B2
(45) Date of Patent: Dec. 31, 2024

(54) WAVELENGTH CONVERSION DEVICE, MANUFACTURING METHODS THEREOF AND PROJECTOR

(71) Applicant: Coretronic Corporation, Hsin-Chu (TW)

(72) Inventors: I-Hua Chen, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/680,238

(22) Filed: Feb. 24, 2022

(65) Prior Publication Data
US 2022/0276550 A1 Sep. 1, 2022

(30) Foreign Application Priority Data

Feb. 26, 2021 (CN) .......................... 202110216540.3

(51) Int. Cl.
*G03B 21/20* (2006.01)
*G02B 5/26* (2006.01)

(52) U.S. Cl.
CPC ........... *G03B 21/2066* (2013.01); *G02B 5/26* (2013.01); *G03B 21/2033* (2013.01)

(58) Field of Classification Search
CPC ............ G03B 21/2066; G03B 21/2033; G03B 21/16; G03B 21/204; G02B 5/26
See application file for complete search history.

(56) References Cited

U.S. PATENT DOCUMENTS

| 2005/0003737 A1 | 1/2005 | Montierth et al. |
| 2016/0069558 A1 | 3/2016 | Hu et al. |

(Continued)

FOREIGN PATENT DOCUMENTS

| CN | 1797181 | 7/2006 |
| CN | 104614926 | 5/2015 |

(Continued)

OTHER PUBLICATIONS

"Office Action of China Counterpart Application", issued on Oct. 26, 2023, p. 1-p. 9.

(Continued)

*Primary Examiner* — Magda Cruz
(74) *Attorney, Agent, or Firm* — JCIPRNET (57) ABSTRACT

A wavelength conversion device, adapted for converting the wavelength of an incident illumination beam, includes a substrate and a wavelength conversion component. The wavelength conversion component is disposed on the substrate and includes a wavelength conversion layer and at least two wavelength conversion spoilers. The at least two wavelength conversion spoilers are disposed on the wavelength conversion layer, protrude from the wavelength conversion layer, and expose part of the wavelength conversion layer, and the height of each of the at least two wavelength conversion spoilers is less than half of the distance between the at least two wavelength conversion spoilers. The wavelength conversion device in the disclosure has good heat dissipation efficiency. A projector including the wavelength conversion device is further provided in the disclosure. Manufacturing methods of the wavelength conversion device are further provided in the disclosure.

9 Claims, 10 Drawing Sheets

(56) References Cited

U.S. PATENT DOCUMENTS

| | | | | |
|---|---|---|---|---|
| 2016/0077325 | A1* | 3/2016 | Tsai | H04N 9/3114 353/31 |
| 2017/0175989 | A1* | 6/2017 | Yamagishi | G03B 21/16 |
| 2017/0261844 | A1* | 9/2017 | Kitade | H04N 9/3158 |
| 2018/0031207 | A1* | 2/2018 | Chang | F21V 9/30 |
| 2019/0094671 | A1* | 3/2019 | Ikeo | G02B 26/008 |
| 2019/0353994 | A1* | 11/2019 | Hsu | G03B 21/16 |
| 2020/0371414 | A1 | 11/2020 | Tsai et al. | |
| 2022/0091492 | A1* | 3/2022 | Kao | G03B 21/204 |
| 2022/0206373 | A1* | 6/2022 | Hsu | G02B 26/008 |
| 2022/0260241 | A1* | 8/2022 | Iizawa | F21V 29/502 |

FOREIGN PATENT DOCUMENTS

| | | |
|---|---|---|
| CN | 104834169 | 8/2015 |
| CN | 106195925 | 12/2016 |
| CN | 106199947 | 12/2016 |
| CN | 206321931 | 7/2017 |
| CN | 107203088 | 9/2017 |
| CN | 105867057 | 3/2018 |
| CN | 109782429 | 5/2019 |
| CN | 209525553 | 10/2019 |
| CN | 110764352 | 2/2020 |
| CN | 111176060 | 5/2020 |
| CN | 111505893 | 8/2020 |
| CN | 211293572 | 8/2020 |
| JP | 2012181431 | 9/2012 |
| JP | 2013250422 | 12/2013 |
| JP | 2017037121 | 2/2017 |
| JP | 2018004668 | 1/2018 |
| TW | I546267 | 8/2016 |
| TW | I582520 | 5/2017 |

OTHER PUBLICATIONS

"Notice of Allowance of China Counterpart Application", issued on Jul. 9, 2024, p. 1-p. 5.

* cited by examiner

WAVELENGTH CONVERSION DEVICE, MANUFACTURING METHODS THEREOF AND PROJECTOR

CROSS-REFERENCE TO RELATED APPLICATION

This application claims the priority benefit of China application serial no. 202110216540.3, filed on Feb. 26, 2021. The entirety of the above-mentioned patent application is hereby incorporated by reference herein and made a part of this specification.

BACKGROUND

Technical Field

The disclosure relates to a wavelength conversion device, manufacturing methods thereof, and a projector, and more particularly, to a wavelength conversion device with good heat dissipation performance, manufacturing methods thereof, and a projector.

Description of Related Art

Generally speaking, the wavelength conversion layer of a projector is affected by the thermal characteristics. When the temperature of the wavelength conversion layer is higher, the luminous efficiency is lower. When the temperature is greater than 150° C., the luminous efficiency will drop sharply. Therefore, the wavelength conversion efficiency highly correlates with the heat dissipation performance of the wavelength conversion layer. How to improve the heat dissipation performance of a wavelength conversion layer is a research goal in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a wavelength conversion device with good heat dissipation efficiency.

The disclosure provides a projector including the wavelength conversion device.

The disclosure provides a manufacturing method of the wavelength conversion device for manufacturing the wavelength conversion device.

In order to achieve one or a part or all of the above or other objectives, in one embodiment of the disclosure, a wavelength conversion device includes a substrate and a wavelength conversion component. The wavelength conversion component includes a wavelength conversion layer and at least two wavelength conversion turbulent elements. The at least two wavelength conversion turbulent elements are disposed on the wavelength conversion layer and protrude from the wavelength conversion layer, the at least two wavelength conversion turbulent elements expose part of the wavelength conversion layer, and a height of each of the at least two wavelength conversion turbulent elements is less than half of a distance between the at least two wavelength conversion turbulent elements.

In order to achieve one or a part or all of the above or other objectives, in one embodiment of the disclosure, a projector includes a light source, a wavelength conversion device, a light valve, and a projection lens. The light source is adapted to emit an illumination beam; the wavelength conversion device is disposed on an optical path of the illumination beam and adapted to convert the illumination beam into converted beams with different wavelengths; the light valve is disposed on an optical path of the converted beam and is adapted to convert the converted beam into an image beam; and the projection lens is disposed on an optical path of the image beam. The wavelength conversion device includes a substrate and a wavelength conversion component, and the wavelength conversion component is disposed on the substrate and includes a wavelength conversion layer and at least two wavelength conversion turbulent elements. The at least two wavelength conversion turbulent elements are disposed on the wavelength conversion layer and protrude from the wavelength conversion layer, the at least two wavelength conversion turbulent elements expose part of the wavelength conversion layer, and a height of each of the at least two wavelength conversion turbulent elements is less than half of a distance between the at least two wavelength conversion turbulent elements.

In order to achieve one or a part or all of the above or other objectives, in one embodiment of the disclosure, a manufacturing method of a wavelength conversion device includes the following steps. A first wavelength conversion material is disposed on a substrate; a first heating process is performed on the first wavelength conversion material on the substrate; a second wavelength conversion material is disposed on a local area of the first wavelength conversion material having been performed the first heating process, and part of the first wavelength conversion material is exposed. Moreover, a second heating process is performed on the first wavelength conversion material and the second wavelength conversion material on the first wavelength conversion material, so the first wavelength conversion material is cured into a wavelength conversion layer, and the second wavelength conversion material is cured into at least two wavelength conversion turbulent elements. The at least two wavelength conversion turbulent elements protrude from the wavelength conversion layer and expose part of the wavelength conversion layer, and a height of each of the at least two wavelength conversion turbulent elements is less than half of a distance between the at least two wavelength conversion turbulent elements.

In order to achieve one or a part or all of the above or other objectives, in one embodiment of the disclosure, a manufacturing method of a wavelength conversion device includes the following steps. A wavelength conversion material is disposed on a substrate, the wavelength conversion material is shaped into a lower layer close to the substrate, and an upper layer structure is disposed on the lower layer. The lower layer with an even thickness is disposed on the substrate, and the upper layer structure is formed on a local area of the lower layer and exposes part of the lower layer. The lower layer and the upper layer structure are heated and cured, so the lower layer is cured into a wavelength conversion layer, and meanwhile the upper layer structure is cured into at least two wavelength conversion turbulent elements. The at least two wavelength conversion turbulent elements protrude from the wavelength conversion layer and expose part of the wavelength conversion layer, and a height of each of the at least two wavelength conversion turbulent elements is less than half of a distance between the at least two wavelength conversion turbulent elements.

Based on the above, the wavelength conversion component of the wavelength conversion device in the disclosure includes a wavelength conversion layer and wavelength conversion turbulent elements. The wavelength conversion turbulent elements are disposed on the wavelength conversion layer and protrude from the wavelength conversion layer. The wavelength conversion device is capable of generating turbulence when the wavelength conversion device rotates through the wavelength conversion turbulent elements protruding from the wavelength conversion layer to improve the heat dissipation performance of the wavelength conversion layer. Moreover, in addition to the wavelength conversion layer, the wavelength conversion device is also capable of converting the wavelength through the wavelength conversion turbulent elements, so the wavelength conversion device has both good quality of heat dissipation and good efficiency of wavelength conversion. The height of each of the wavelength conversion turbulent elements is less than half of the distance between the two wavelength conversion turbulent elements, and a better heat dissipation performance can be enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
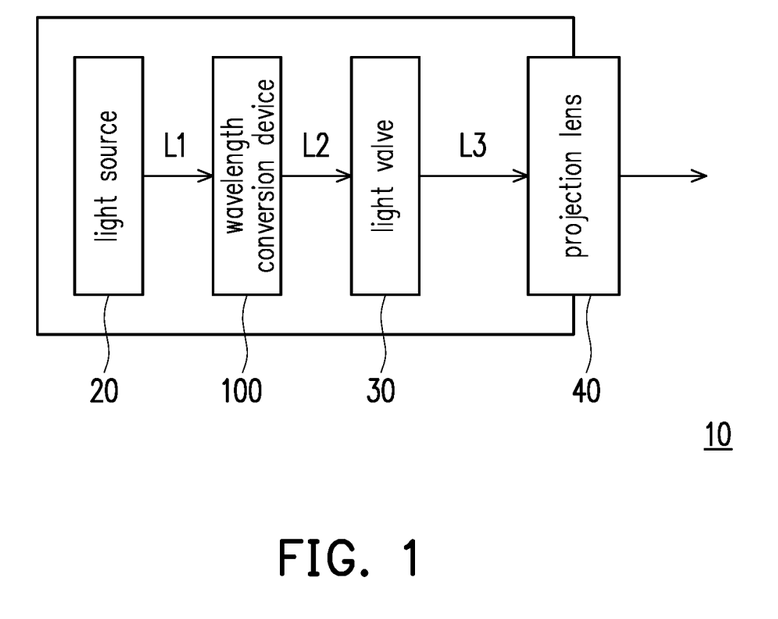
FIG. 1 is a schematic view of a projector according to an embodiment of the disclosure.

FIG. 1 is a schematic view of a projector according to an embodiment of the disclosure. Referring to FIG. 1, a projector 10 in the embodiment includes a light source 20, a wavelength conversion device 100, a light valve 30, and a projection lens 40. The light source 20 is adapted to emit an illumination beam L1. In the embodiment, for example, the light source 20 is a laser light source. However, the light source 20 may also be a light-emitting diode, and the disclosure is not limited thereto. The light emitted by the light source 20 is blue light, for example, but it may also be light beams of other colors, and the disclosure is not limited thereto. For example, the light source 20 may include multiple laser elements (not shown), for example; the laser elements are arranged in an array, for example; and the laser elements are laser diodes (LDs), for example. In other embodiments, one or more light sources 20 may be disposed. In other embodiments, the light source 20 may be a solid-state illumination source, such as a light-emitting diode.

The wavelength conversion device 100 is disposed on the optical path of the illumination beam L1 and adapted to convert the illumination beam L1 into a converted beam L2. The wavelength of the illumination beam L1 is different from the wavelength of the converted beam L2.

The light valve 30 is disposed on the optical path of the converted beam L2 and adapted to convert the converted beam L2 into an image beam L3. In the embodiment, for example, the light valve 30 is a digital micro-mirror device (DMD) or reflective light modulators such as a liquid-crystal-on-silicon (LCOS) panel. In some embodiments, for example, the light valve may be a transmissive liquid crystal display panel, or a transmissive light modulator, such as an electro-optical modulator, a magneto-optic modulator, an acousto-optic modulator (AOM), or the like. However, the disclosure is not limited thereto.

The projection lens 40 is disposed on the optical path of the image beam L3. For example, the projection lens 40 includes a combination of one or more optical lenses with refractive power, such as various combinations of non-planar lenses such as biconcave lenses, biconvex lenses, meniscus lenses, convex-concave lenses, plano-convex lenses, and plano-concave lenses. In one embodiment, the projection lens 40 may also include a flat optical lens to project the image beam L3 from the light valve 30 out of the projector 10 in a reflective or transmitting manner, but the type and mode of the projection lens 40 are not limited thereto.

In the embodiment, the wavelength conversion device 100 comes with a special design and is capable of having good heat dissipation performance, which is explained in the subsequent paragraphs.

Figure 2:
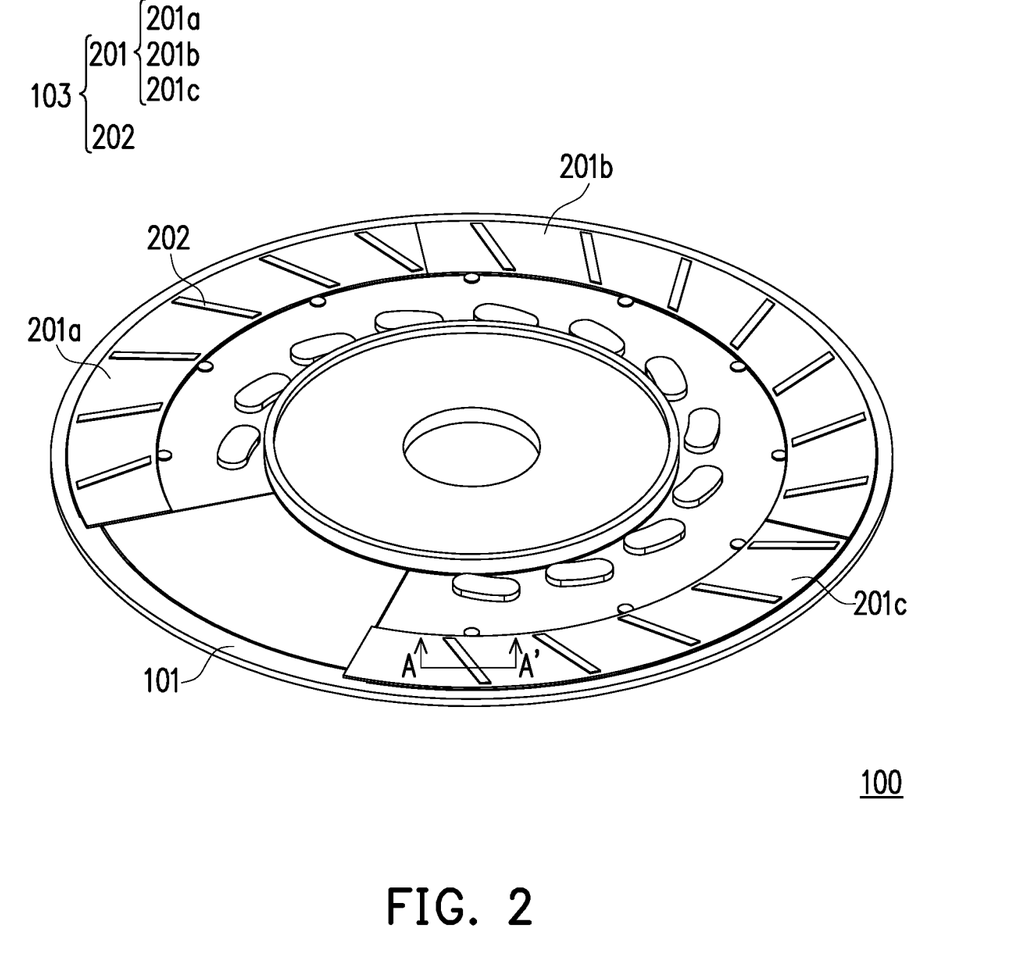
FIG. 2 is a schematic view of a wavelength conversion device according to an embodiment of the disclosure.
Figure 3:
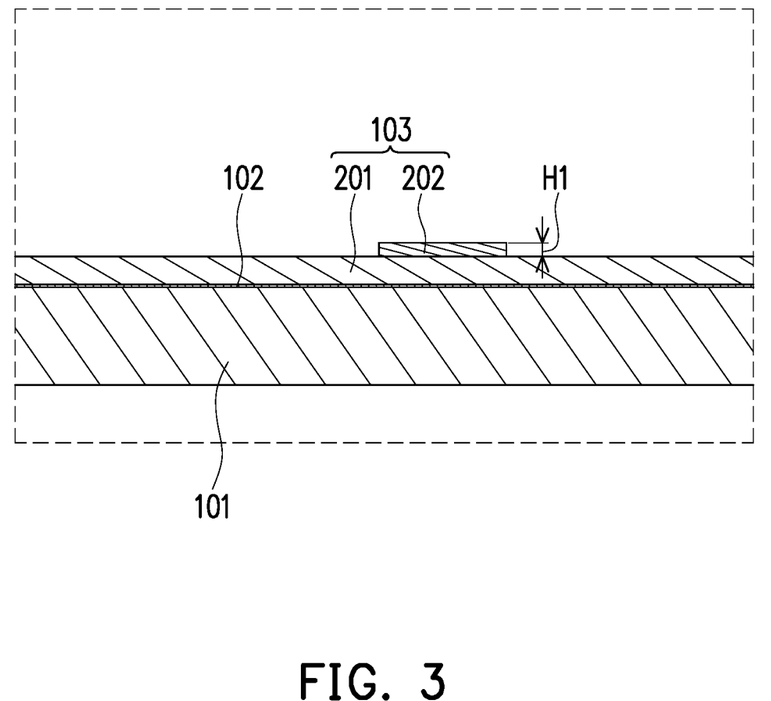
FIG. 3 is a cross-sectional view of the wavelength conversion device of FIG. 2 along the line AA'.

FIG. 2 is a three-dimensional schematic view of a wavelength conversion device according to an embodiment of the disclosure. FIG. 3 is a cross-sectional view of the wavelength conversion device of FIG. 2 along the line AA'. Referring to FIG. 2 and FIG. 3, the wavelength conversion device 100 in the embodiment includes a substrate 101, a reflective layer 102 (see FIG. 3), and a wavelength conversion component 103. The reflective layer 102 is disposed on the substrate 101, and the wavelength conversion component 103 is disposed on the reflective layer 102.

The material of the substrate 101 is a material with a thermal conductivity greater than 20 W/mk. For example, the substrate 101 is a heat dissipation substrate including materials such as aluminum, aluminum alloy, copper, copper alloy, aluminum nitride, silicon carbide, and aluminum oxide. The reflective layer 102 may be a specular reflective layer (e.g., a silver-plated layer, a silver-plated and dielectric layer, or a metal film and dielectric layer) or a diffuse reflection layer (e.g., white scattering particles, such as $TiO_2$, $SiO_2$, $Al_2O_3$, BN, $ZrO_2$, and the like, include a single type of powder or a mixture of powder).

The wavelength conversion component 103 includes a wavelength conversion layer 201 and wavelength conversion turbulent elements 202. The wavelength conversion turbulent elements 202 are disposed on at least part of the wavelength conversion layer 201. The material of the wavelength conversion component 103 is mainly phosphor powder mixed with various adhesives (e.g., glue, glass, or ceramic powder, etc.). Specifically, the material of the wavelength conversion component 103 may be phosphor in ceramic (PIC), phosphor in glass (PIG), phosphor in silicon (PIS), or phosphor powder mixed with other substances (alcohol-soluble or water-based low-temperature inorganic glue), but the disclosure is not limited thereto.

The wavelength conversion layer 201 may have multiple portions, and the portions include different wavelength conversion materials to convert the illumination beam L1 into the converted beam L2 with different wavelengths. In the embodiment, the wavelength conversion layer 201 includes a first portion 201a, a second portion 201b, and a third portion 201c. The first portion 201a may be adapted to convert the illumination beam L1 into red light, the second portion 201b may be adapted to convert the illumination beam L1 into yellow light, and the third portion 201c may be adapted to convert the illumination beam L1 into green light, but the color light to be converted by the first portion 201a, the second portion 201b, and the third portion 201c are not limited thereto.

In addition, the phosphor powder in the wavelength conversion turbulent elements 202 may be the same as or different from the phosphor powder in the wavelength conversion layer 201 disposed under the wavelength conversion turbulent element 202. For example, the wavelength conversion turbulent element 202 with yellow phosphor powder may be disposed on the wavelength conversion layer 201 with yellow phosphor powder. Alternatively, the wavelength conversion turbulent element 202 with green phosphor powder is disposed on the wavelength conversion layer 201 with yellow phosphor powder. Accordingly, the configuration contributes to fine-tuning colors or converting incident light into light with different wavelengths. As shown in FIG. 2, for example, the wavelength conversion layer 201 is C-shaped and disposed on the substrate 101, and the wavelength conversion turbulent elements 202 are uniformly distributed on the first portion 201a, the second portion 201b, and the third portion 201c of the wavelength conversion layer 201, for example.

In the embodiment, at least part of the surface of the wavelength conversion layer 201 has the wavelength conversion turbulent elements 202, capable of improving the heat dissipation performance of the wavelength conversion component 103, improving the excitation efficiency, and further increasing the brightness of the light provided by optical engine device. Since the wavelength conversion turbulent elements 202 are disposed on the wavelength conversion layer 201 and the surfaces of the wavelength conversion turbulent elements 202 and the wavelength conversion layer 201 both face the light source 20, the surfaces of both may form uneven surfaces, and the wavelength conversion turbulent elements 202 have a certain heat dissipation effect, thereby reducing the temperature of the wavelength conversion layer 201.

In addition, experimental data shows that for a laser projector with 10,000 lumens, the brightness of the wavelength conversion component 103 in the embodiment is about 2 to 3% higher than that of the conventional wavelength conversion layer without a turbulent element, and the wavelength conversion component 103 has good excitation efficiency.

Figure 4:
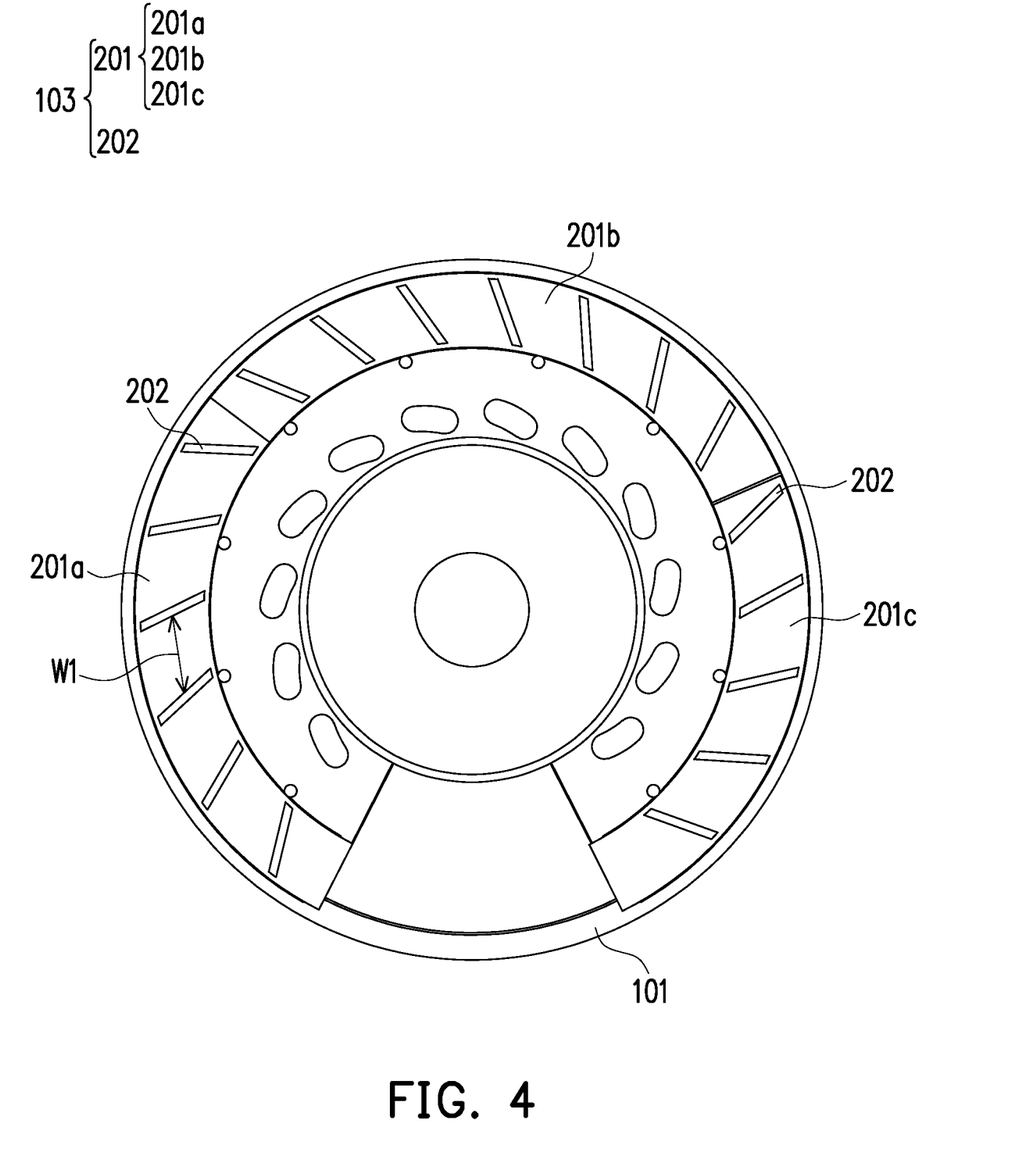
FIG. 4 is a schematic top view of the wavelength conversion device of FIG. 2.

FIG. 4 is a schematic top view of the wavelength conversion device of FIG. 2. Referring to FIG. 4, in the embodiment, for example, the wavelength conversion turbulent element 202 is strip-shaped, but the shape of the wavelength conversion turbulent element 202 is not limited thereto. In addition, the wavelength conversion turbulent elements 202 are uniformly arranged on the entire wavelength conversion layer 201. In addition, the wavelength conversion turbulent elements 202 have a predetermined distance among one another.

In addition, a height H1 (see FIG. 3) of each of the wavelength conversion turbulent elements 202 is less than half of a distance W1 (see FIG. 4) between any two wavelength conversion turbulent elements 202. Specifically, among the wavelength conversion turbulent elements 202, the distance W1 (see FIG. 4) between any two wavelength conversion turbulent elements 202 ranges from 3 mm to 10 mm. The height H1 (see FIG. 3) of the wavelength conversion turbulent element 202 protruding from the wavelength conversion layer 201 ranges from 0.05 mm to 0.5 mm.

Figure 5:
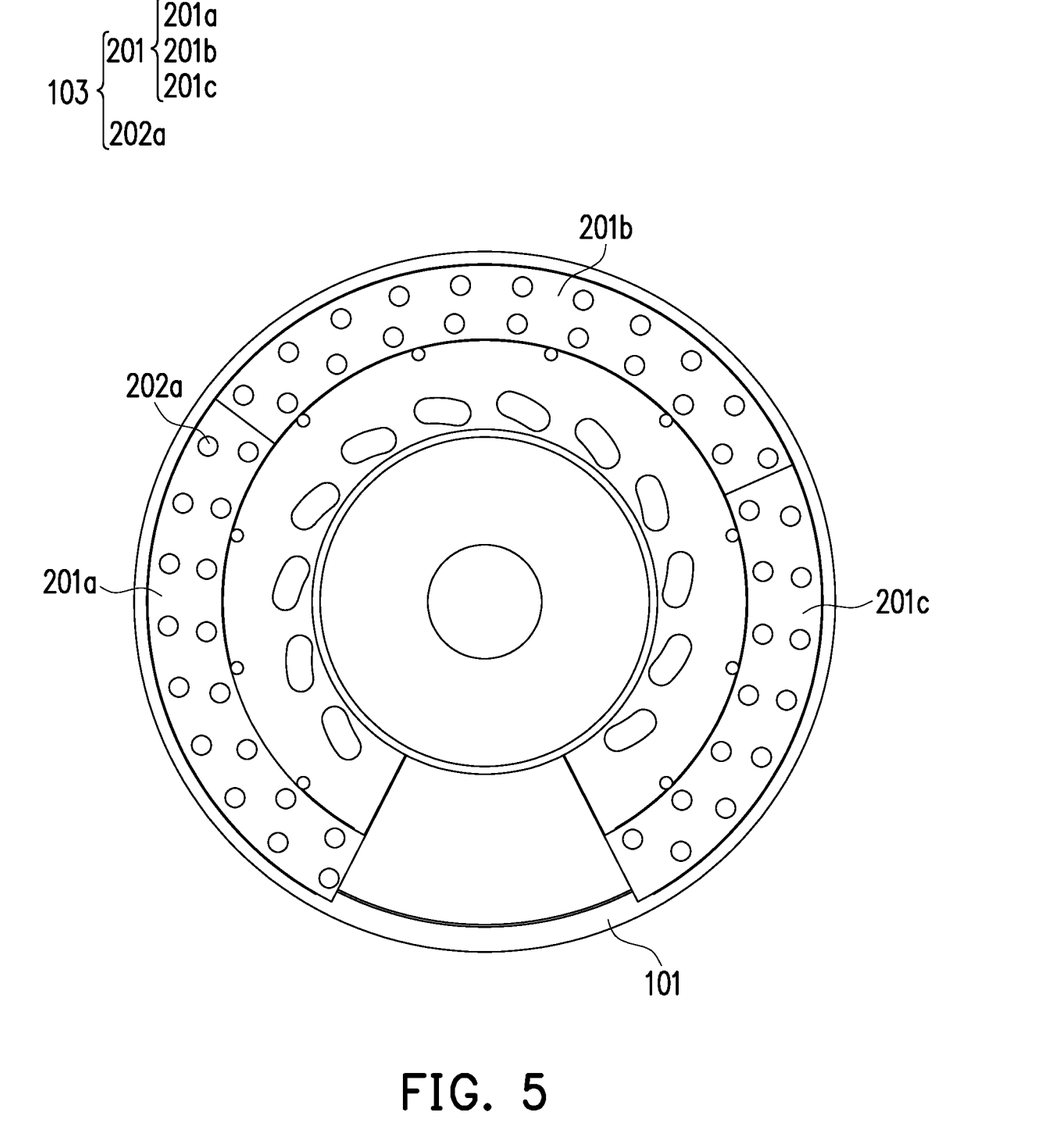
FIG. 5 is a schematic view of a wavelength conversion device according to another embodiment of the disclosure.

FIG. 5 is a schematic view of a wavelength conversion device according to another embodiment of the disclosure. Referring to FIG. 5, in the embodiment, for example, the wavelength conversion turbulent elements 202a are dot-shaped, and the wavelength conversion turbulent elements 202a are uniformly distributed on the entire wavelength conversion layer 201.

Figure 6:
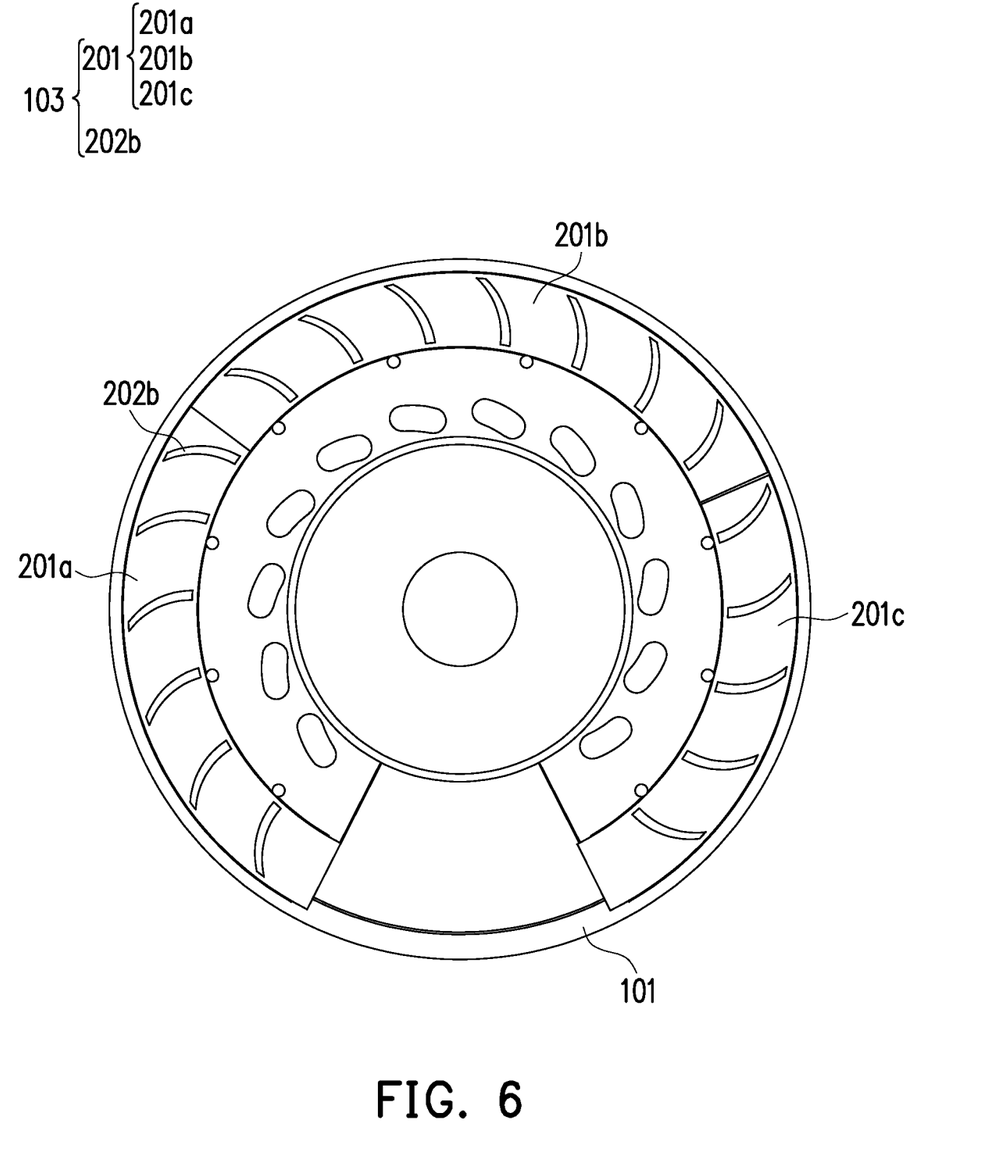
FIG. 6 is a schematic view of a wavelength conversion device according to another embodiment of the disclosure.

FIG. 6 is a schematic view of a wavelength conversion device according to another embodiment of the disclosure. Referring to FIG. 6, in the embodiment, for example, the wavelength conversion turbulent elements 202b are arc-shaped, and the wavelength conversion turbulent elements 202b are uniformly arranged on the entire wavelength conversion layer 201.

Figure 7:
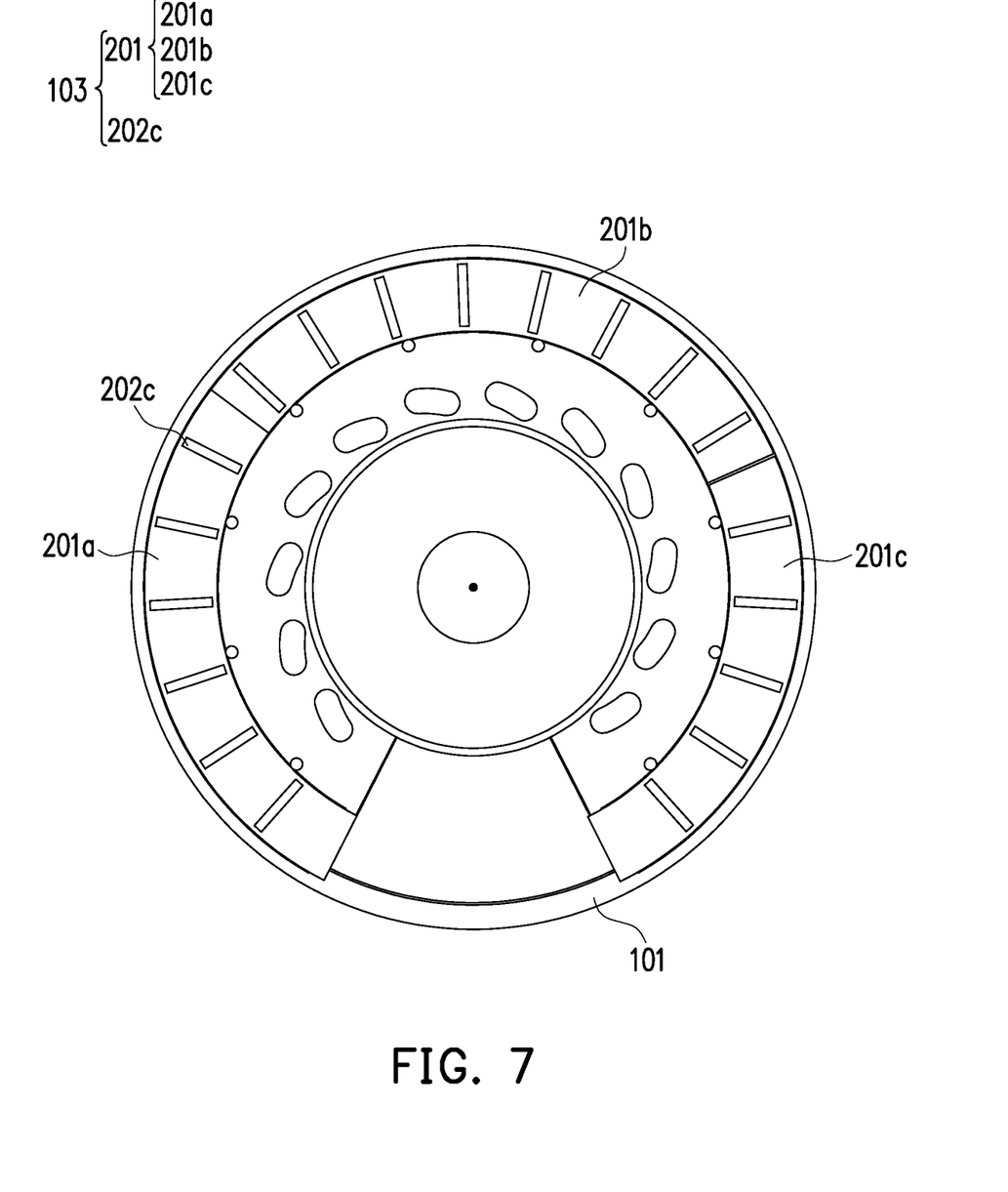
FIG. 7 is a schematic view of a wavelength conversion device according to another embodiment of the disclosure.

FIG. 7 is a schematic view of a wavelength conversion device according to another embodiment of the disclosure. Referring to FIG. 7, in the embodiment, the shape of the wavelength conversion turbulent element 202c of FIG. 7 is the same as the shape of the wavelength conversion turbulent element 202 of FIG. 4, both of them are strip-shaped, but the arrangements are slightly different. In FIG. 7, the wavelength conversion turbulent elements 202c are in a radial pattern extending in the radial direction from the center of the substrate. The arrangement direction of the wavelength conversion turbulent elements 202c is not limited thereto.

Figure 8:
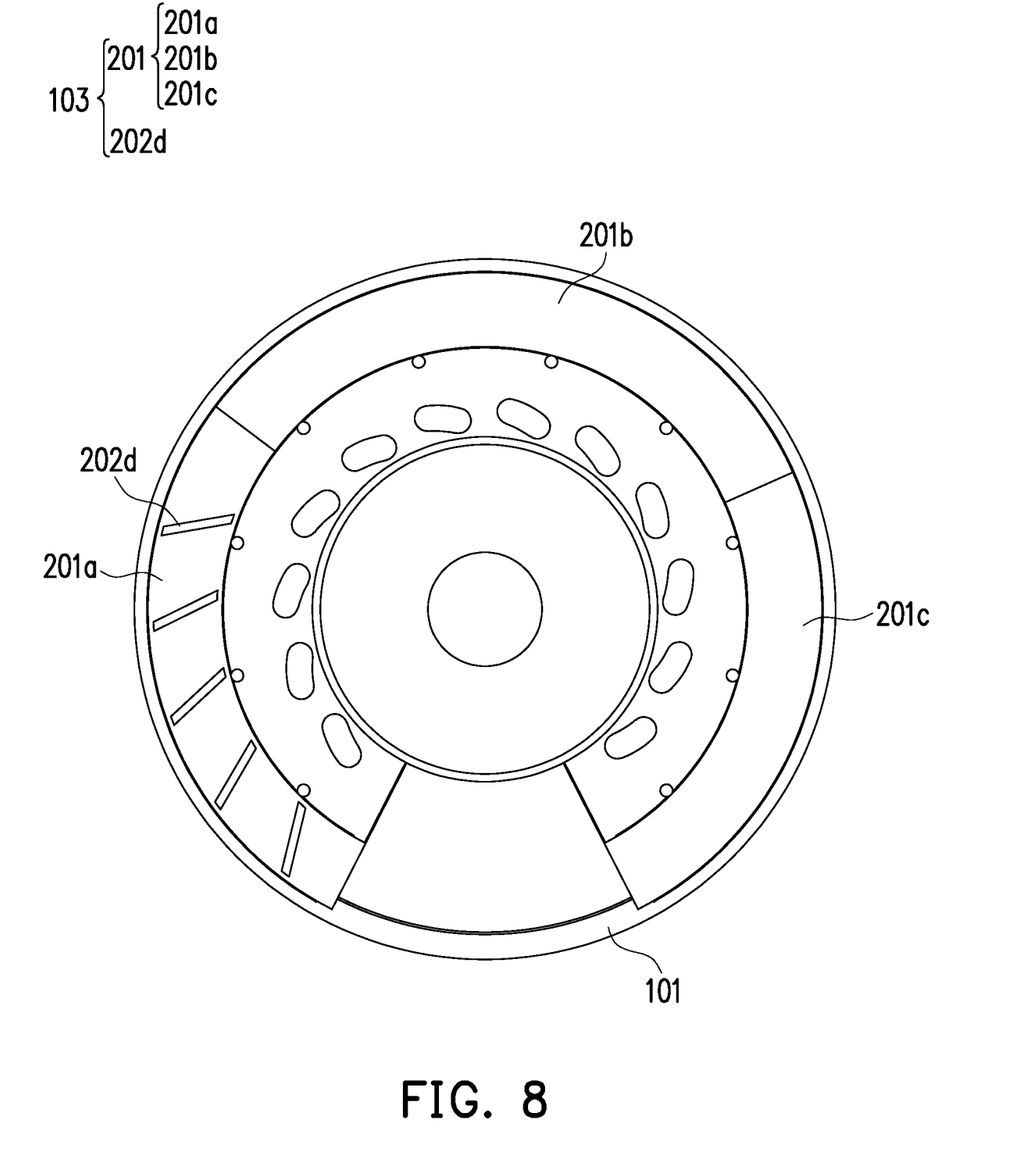
FIG. 8 is a schematic view of a wavelength conversion device according to another embodiment of the disclosure.

FIG. 8 is a schematic view of a wavelength conversion device according to another embodiment of the disclosure. Referring to FIG. 8, in the embodiment, the wavelength conversion turbulent elements 202d may also be disposed in a local area of the wavelength conversion layer 201, such as only being disposed on the first portion 201a but not on the second portion 201b and the third portion 201c. In other embodiments, the wavelength conversion turbulent elements 202d may also be only disposed on the second portion 201b or on the third portion 201c, and the disclosure is not limited thereto.

Specifically, since the phosphor powder used in the wavelength conversion component 103 is different, the thermal characteristics are also different. The wavelength conversion turbulent elements 202d may be disposed on the portion (e.g., the first portion 201a) of the wavelength conversion component 103 having phosphor powder (with an excitation wavelength greater than or equal to 540 nm) that can excite a beam with a long wavelength. In contrast, the wavelength conversion turbulent elements 202d may not be disposed on the portion (e.g., the second portion 201b and the third portion 201c) having phosphor powder (with an excitation wavelength less than or equal to 520 nm) that can excite a beam with a short wavelength.

In other words, the designer can optimize the excitation efficiency according to the characteristics of different phosphor powder.

Figure 9:
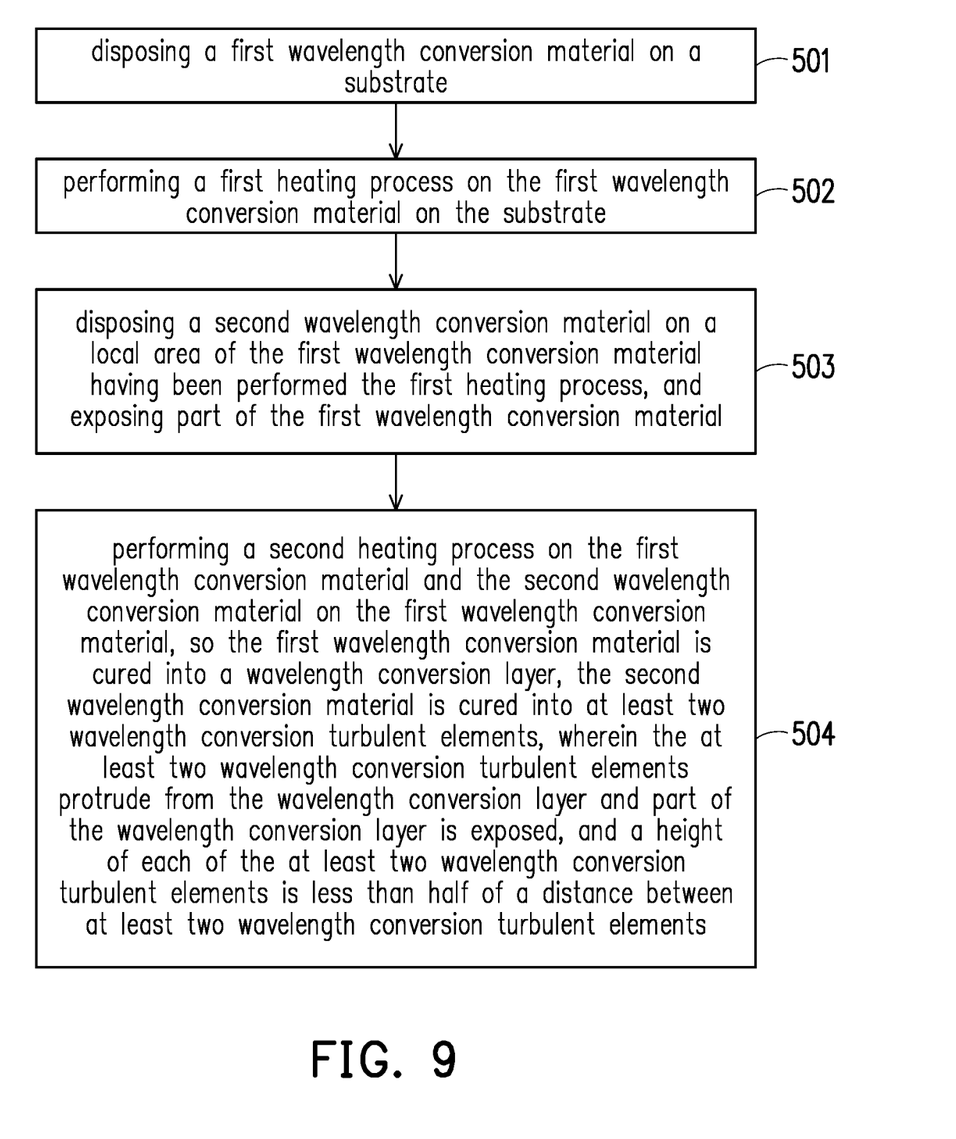
FIG. 9 is a flowchart of a manufacturing method for a wavelength conversion device according to an embodiment of the disclosure.

FIG. 9 is a flowchart of a manufacturing method for a wavelength conversion device according to an embodiment of the disclosure. Referring to FIG. 9, the manufacturing method of the wavelength conversion device 100 includes the following steps. First, in step 501, a first wavelength conversion material is disposed on the substrate 101. Specifically, for example, the first wavelength conversion material is a mixture of phosphor powder, glass powder, and organic solvent and disposed on the substrate 101 by printing, spraying, or dispensing. For example, the first wavelength conversion material is centered on the axis (with no reference numeral) of the substrate 101 and uniformly arranged on the substrate 101 in a complete or partial ring.

Next proceeding to step 502, a first heating process is performed on the first wavelength conversion material on the substrate. In one embodiment, the first heating process may be a pre-bake process, and the temperature is lower than 200° C. For example, the heating temperature ranges from 150° C. to 200° C. In an embodiment, the first heating process may also be a curing process, and a high temperature (a sintering temperature greater than 1500° C.) is adapted to sinter the first wavelength conversion material.

In step 503, a second wavelength conversion material is disposed on the local area of the first wavelength conversion material where has been performed the first heating process, and part of the first wavelength conversion material is exposed. The second wavelength conversion material may be the same as or different from the first wavelength conversion material.

In step 504, a second heating process is performed on the first wavelength conversion material and the second wavelength conversion material. The second heating process is a curing process, and the heating temperature of the second heating process ranges from 700° C. to 1000° C. The first wavelength conversion material is cured into the wavelength conversion layer 201, and the second wavelength conversion material is cured into at least two wavelength conversion turbulent elements 202. The at least two wavelength conversion turbulent elements 202 protrude from the wavelength conversion layer 201, part of the wavelength conversion layer 201 is exposed, and the height of each of the at least two wavelength conversion turbulent elements 202 is less than half of the distance W1 between the at least two wavelength conversion turbulent elements 202.

In addition, in one embodiment, if the difference between the curing temperature of the first wavelength conversion material and the curing temperature of the second wavelength conversion material is less than 100° C., the first heating process is a pre-bake process, and the heating temperature ranges from 150° C. to 200° C. to pre-bake and shape the first wavelength conversion material. Next, the second wavelength conversion material is disposed on the local area of the first wavelength conversion material, and subsequently the first wavelength conversion material and the second wavelength conversion material are cured together to form the wavelength conversion layer 201 and the wavelength conversion turbulent elements 202.

In one embodiment, if the difference between the curing temperature of the first wavelength conversion material and the curing temperature of the second wavelength conversion material is greater than 100° C., the first heating process is the first curing process. That is, the wavelength conversion layer 201 is disposed first. For example, the first wavelength conversion material (e.g., a mixture of phosphor powder and ceramic powder) is pressed into an ingot and sintered, and after sintering (the sintering temperature is greater than 1500° C.), it is cut, ground, polished, and made into a phosphor sheet (i.e. the wavelength conversion layer 201). Then, the second wavelength conversion material (e.g. a mixture of phosphor powder, glass powder, and organic solvent) is coated on the wavelength conversion layer 201 by dispensing, and the second heating process (the second curing process) is performed to obtain the wavelength conversion turbulent elements 202. In the embodiment, the heating temperature of the first heating process is greater than the curing temperature of the first wavelength conversion material and the heating temperature of the second heating process, and the heating temperature of the second heating process is greater than the curing temperature of the second wavelength conversion material. The heating temperature of the first heating process is greater than 1500° C., and the heating temperature of the second heating process ranges from 700° C. to 1000° C.

Figure 10:
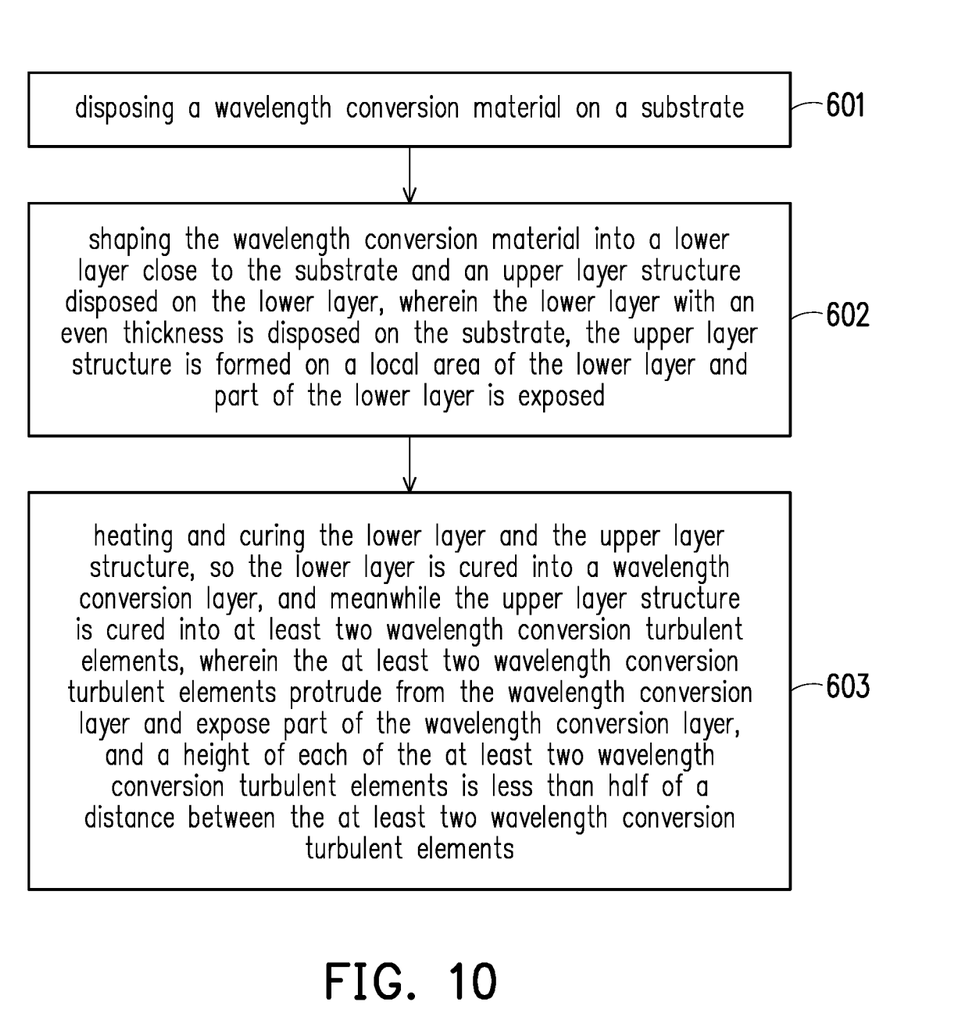
FIG. 10 is a flowchart of a manufacturing method for a wavelength conversion device according to another embodiment of the disclosure.

FIG. 10 is a flowchart of a manufacturing method for a wavelength conversion device according to another embodiment of the disclosure. Referring to FIG. 10, the wavelength conversion device 100 may also simultaneously mold the wavelength conversion layer 201 and the wavelength conversion turbulent elements 202 with a mold. In step 601, the wavelength conversion material may be disposed on the substrate 101 first. That is, the mold is first disposed on the substrate, and then the wavelength conversion material is injected between the substrate and the mold.

In step 602, the wavelength conversion material is then shaped into a lower layer close to the substrate 101 and an upper layer structure disposed on the lower layer. Moreover, the lower layer with an even thickness is disposed on the substrate 101, the lower layer has a surface substantially parallel to the substrate, the upper layer structure is formed in a local area of the lower layer, and part of the lower layer is exposed.

In step 603, the lower layer and the upper layer structure are cured by heating, so that the lower layer is cured into the wavelength conversion layer 201, and meanwhile the upper layer structure is cured into at least two wavelength conversion turbulent elements 202. The at least two wavelength conversion turbulent elements 202 protrude from the wavelength conversion layer 201, part of the wavelength conversion layer 201 is exposed, and the height of each of the at least two wavelength conversion turbulent elements 202 is less than half of the distance W1 between the at least two wavelength conversion turbulent elements 202.

In short, in the embodiment, the manufacturer can mix phosphor powder, glass powder, and organic solvent; next perform printing, spraying, or dispensing to dispose the wavelength conversion structure first; and then use a mold to shape the upper layer structure and the lower layer. The lower layer is a planar structure, and the upper layer structure is a turbulent structure. Furthermore, both layers are cured together. The lower layer is cured into the wavelength conversion layer 201, while the upper layer structure is cured into the wavelength conversion turbulent elements 202.

Based on the above, the wavelength conversion component of the wavelength conversion device in the disclosure includes a wavelength conversion layer and wavelength conversion turbulent elements. The wavelength conversion turbulent elements are disposed on the wavelength conversion layer and protrude from the wavelength conversion layer. The wavelength conversion device is capable of generating turbulence when the wavelength conversion device rotates through the wavelength conversion turbulent elements protruding from the wavelength conversion layer to improve the heat dissipation performance of the wavelength conversion layer. Moreover, in addition to the wavelength conversion layer, the wavelength conversion device is also capable of converting the wavelength through the wavelength conversion turbulent elements, so the wavelength conversion device has both good quality of heat dissipation and good efficiency of wavelength conversion. The height of each of the wavelength conversion turbulent elements is less than half of the distance between the two wavelength conversion turbulent elements, and a better heat dissipation performance can be enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device adapted for converting a wavelength of an illumination beam, wherein the wavelength conversion device comprises a substrate and a wavelength conversion component, wherein the wavelength conversion component is disposed on the substrate and comprises a wavelength conversion layer and at least two wavelength conversion turbulent elements, wherein the at least two wavelength conversion turbulent elements are disposed on the wavelength conversion layer and protrude from the wavelength conversion layer, the at least two wavelength conversion turbulent elements expose part of the wavelength conversion layer, and a height of each of the at least two wavelength conversion turbulent elements is less than half of a distance between the at least two wavelength conversion turbulent elements, wherein the at least two wavelength conversion turbulent elements comprise a material the same as or different from a material of the wavelength conversion layer and if the at least two wavelength conversion turbulent elements comprise the material different from the material of the wavelength conversion layer, the at least two wavelength conversion turbulent elements convert the illumination beam into converted beams having wavelengths different from a converted beam converted by the wavelength conversion layer.

2. The wavelength conversion device according to claim 1, wherein the at least two wavelength conversion turbulent elements are strip-shaped, arc-shaped, dot-shaped, or irregularly-shaped.

3. The wavelength conversion device according to claim 1, wherein the at least two wavelength conversion turbulent elements are disposed in a radial pattern.

4. The wavelength conversion device according to claim 1, wherein a distance between any two adjacent ones of the at least two wavelength conversion turbulent elements ranges from 3 mm to 10 mm.

5. The wavelength conversion device according to claim 1, wherein the height of each of the at least two wavelength conversion turbulent elements protruding from the wavelength conversion layer ranges from 0.05 mm to 0.5 mm.

6. The wavelength conversion device according to claim 1, wherein the at least two wavelength conversion turbulent elements are uniformly disposed on the wavelength conversion layer.

7. The wavelength conversion device according to claim 1, wherein the wavelength conversion layer comprises a first portion and a second portion, a wavelength of a converted beam of the illumination beam converted by the first portion is different from a wavelength of a converted beam converted by the second portion, and the at least two wavelength conversion turbulent elements are disposed on the first portion but not disposed on the second portion.

8. A projector, comprising a light source, the wavelength conversion device according to claim 1, a light valve, and a projection lens,
wherein the light source is adapted to emit the illumination beam;
the wavelength conversion device is disposed on an optical path of the illumination beam and adapted to convert the illumination beam into converted beams with different wavelengths;
the light valve is disposed on an optical path of the converted beam and is adapted to convert the converted beam into an image beam; and
the projection lens is disposed on an optical path of the image beam.

9. A wavelength conversion device adapted for converting a wavelength of an-illumination beam, wherein the wavelength conversion device comprises a substrate and a wavelength conversion component,
wherein the wavelength conversion component is disposed on the substrate and comprises a wavelength conversion layer and at least two wavelength conversion turbulent elements, wherein the at least two wavelength conversion turbulent elements are disposed on the wavelength conversion layer and protrude from the wavelength conversion layer, the at least two wavelength conversion turbulent elements expose part of the wavelength conversion layer, and a height of each of the at least two wavelength conversion turbulent elements is less than half of a distance between the at least two wavelength conversion turbulent elements,
wherein the wavelength conversion layer comprises a first portion and a second portion, a wavelength of a converted beam of the illumination beam converted by the first portion is different from a wavelength of a converted beam converted by the second portion, and the at least two wavelength conversion turbulent elements are disposed on the first portion but not disposed on the second portion.

* * * * *